(12) United States Patent
Sakakima et al.

(10) Patent No.: US 6,650,598 B2
(45) Date of Patent: Nov. 18, 2003

(54) MAGNETIC HEAD HAVING MAGNETORESISTANCE DEVICE AND RECORDING/REPRODUCING APPARATUS INCORPORATING THE SAME

(75) Inventors: Hiroshi Sakakima, Kyoto (JP); Masahiro Birukawa, Hirakata (JP); Kazuo Yokoyama, Osaka (JP); Masayoshi Hiramoto, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/293,420

(22) Filed: Nov. 12, 2002

(65) Prior Publication Data

US 2003/0072221 A1 Apr. 17, 2003

Related U.S. Application Data

(62) Division of application No. 09/603,072, filed on Jun. 26, 2000, now Pat. No. 6,504,796.

(30) Foreign Application Priority Data

Jun. 24, 1999 (JP) ............................................. 11-177911
Sep. 8, 1999 (JP) ............................................. 11-254417
Jun. 23, 2000 (JP) ............................................ 2000-189846

(51) Int. Cl.⁷ ............................................... G11B 11/00
(52) U.S. Cl. .................................... 369/13.17; 360/324.1
(58) Field of Search ........................... 369/13.17, 13.18, 369/13.19, 13.32, 13.13, 13.33; 360/125, 126, 328, 324.1, 324.11

(56) References Cited

U.S. PATENT DOCUMENTS

| 5,742,458 | A | * | 4/1998 | Koike et al. ................. 360/113 |
| 6,195,239 | B1 | * | 2/2001 | Araki et al. ............ 360/324.11 |
| 6,210,810 | B1 | * | 4/2001 | Ikarashi et al. .............. 428/611 |
| 6,258,470 | B1 | * | 7/2001 | Sakakima et al. .......... 360/113 |
| 6,271,998 | B1 | * | 8/2001 | Coehoorn et al. .......... 360/324 |
| 6,295,186 | B1 | * | 9/2001 | Hasegawa et al. ..... 360/324.11 |

FOREIGN PATENT DOCUMENTS

JP 63-138513 6/1988
JP 9-282616 10/1997

* cited by examiner

*Primary Examiner*—Tan Dinh
(74) *Attorney, Agent, or Firm*—Renner, Otto, Boisselle & Sklar

(57) ABSTRACT

A magnetic head for reproducing a signal recorded on a recording medium, includes a substrate, a magnetic head core provided on the substrate, having a magnetic gap, and a magnetoresistance device provided on the magnetic head core. The magnetic head core is provided in such a manner that a thickness direction of the magnetic head core around the magnetic gap is substantially the same as a track width direction of the recording medium.

26 Claims, 12 Drawing Sheets

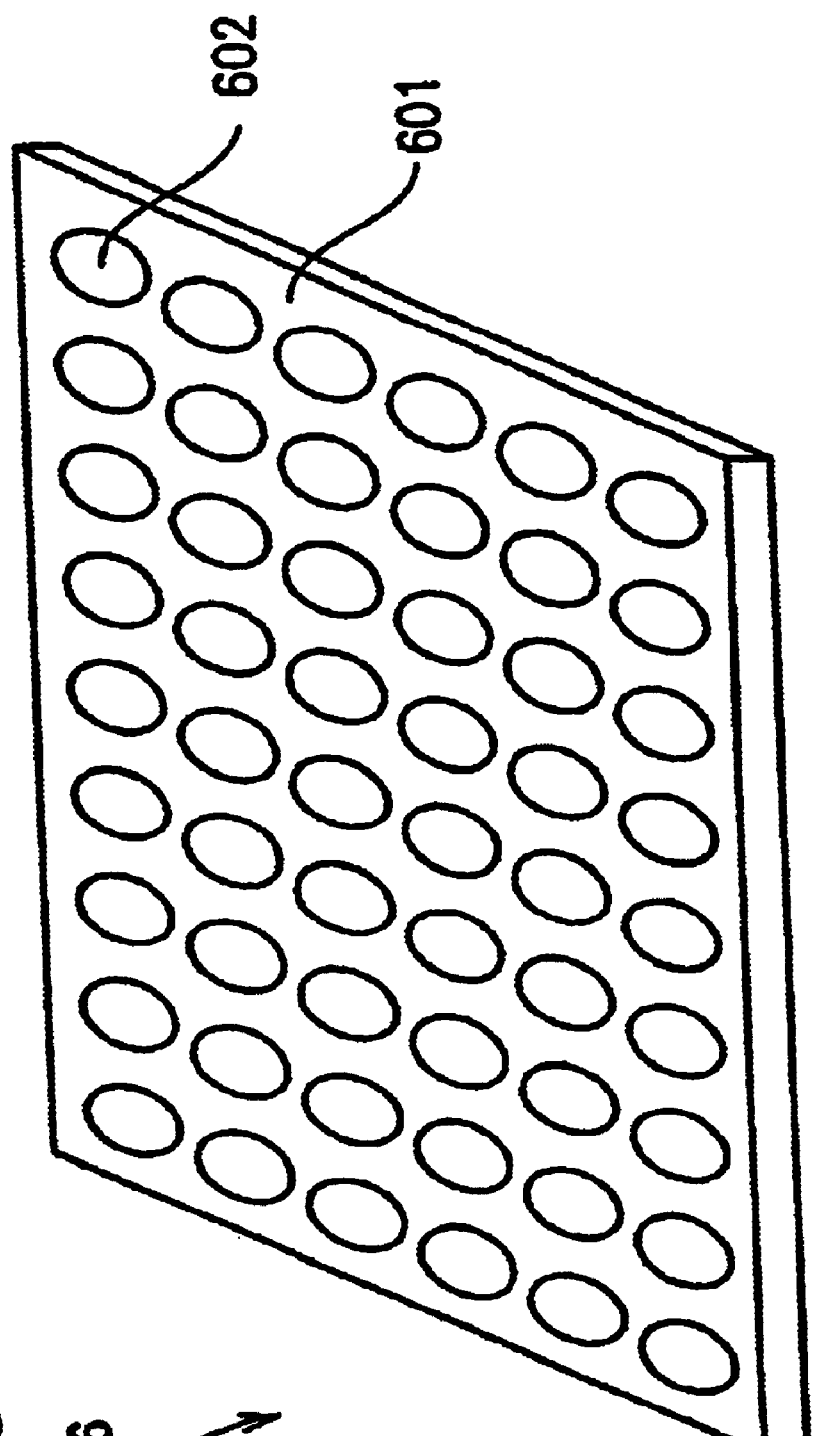

MAGNETIC HEAD HAVING MAGNETORESISTANCE DEVICE AND RECORDING/REPRODUCING APPARATUS INCORPORATING THE SAME

This is a division of application Ser. No. 09/603,072, filed Jun. 26, 2000 now U.S. Pat. No. 6,504,796.

BACKGROUND OF THE INVENTION

1. Field of the Invention

The present invention relates to a recording/reproducing head and a recording/reproducing apparatus incorporating the recording/reproducing head. More particularly, the present invention relates to a recording/reproducing head, a recording/reproducing apparatus, and a fabrication method thereof which are capable of higher-density recording than conventional hard disks and magneto-optical disk apparatuses.

2. Description of the Related Art

A hard disk drive (HDD) 1000 represented in FIG. 11 or a magneto-optical disk (MO) apparatus 2000 represented in FIG. 12 can record information signal in high density. These apparatuses include a magnetic head 1019 and a magneto-optical head 2020, respectively, as a recording/reproducing head.

When the magnetic head 1019 as shown in FIG. 11 is used to attempt to obtain high-density recording/reproducing which exceeds about 40 Gb/inch$^2$, reproducing is feasible if a giant magnetoresistive (GMR) device 1014 is provided between shields 1015. In a structure of the magnetic head 1019 in which a surface of the GMR device 1014 is exposed, friction or noise occurs due to the GMR device 1014. When a tunnel type GMR (TMR) device is used instead of the GMR device 1014, a short circuit is likely to occur. Such a problem may be avoided by means of a so-called yoke-type head (not shown). In a conventional yoke-type head, however, a gap needs to be provided between the GMR device 1014 (or the TMR device) and the yoke, e.g., an insulating film or the like is provided in the gap. Such a gap, however, leads to a reduction in reproduced output. As to the recording, the width of a track needs to be on the order of less than a micron (<0.3 μm) while the film thickness of the magnetic head 1019 is held on the order of microns. This leads to an extraordinarily large aspect ratio and thus difficulty in processing. In the future, the length of a recorded bit in a recording medium is expected to be about 50 nm or less. In a recording medium having such a small bit size, thermal fluctuation must be taken into consideration. When an in-plane recording medium is used as a recording medium 1016, the coercive force of the recording medium 1016 needs to be significantly large. A recording magnet 1017 of the magnetic head 1019 is required to include a magnetic film having a saturated magnetization of about 2.5 T (tesla) or more so as to magnetize such a recording medium. At the present time, there exists substantially no such magnetic film.

On the other hand, in the magneto-optical head 2020 shown in FIG. 12, a recording medium 2016 is heated by laser light condensed by a condenser 2018 up to a temperature such that reversal of magnetization is likely to occur. In addition, a magnetization modulation technique using a magnetic head 2019 is utilized to record information into a bit which is smaller than the wavelength of laser light.

The magneto-optical head 2020 having the above-described structure shown in FIG. 12 can provide the same level of high-density recording as that of the HDD. Upon reproducing, however, the recorded bit needs to be enlarged up to as much as the wavelength of laser light. To this end, various methods have been proposed, but there still remains challenges insofar as practical use.

In such situations, a new recording/reproducing apparatus 3000 as shown in FIG. 13 has been proposed. The recording/reproducing apparatus 3000 includes a magneto-optical head 2020 and a GMR head 3019. Recording is performed using the magneto-optical head 2020. Reproducing is performed using the GMR head 3019. That is, two different heads are used for recording and reproducing, respectively. A recording medium 2016 for a magneto-optical disk is used as a recording medium.

On the other hand, in a recording/reproducing apparatus 4000 shown in FIG. 14, a magnetic head 1019 for HDD is used. A recording medium 4016 is irradiated by laser light at a side thereof opposite to the magnetic head 1019. This allows facilitation of reversal of magnetization in recording and facilitation of reading in reproducing.

However, the recording/reproducing apparatus 3000 shown in FIG. 13 requires two heads for recording and reproducing. There is a problem in that recording and reproducing are performed by the separate heads. Moreover, the recording/reproducing apparatus 4000 shown in FIG. 14 requires a servo technique to bring laser light to a region recorded on a recording medium. There is a problem in that the higher the density of recording, the greater the technical difficulty. In this case, there is also a significant problem with the processing of the small-width track in the HDD recording head as described above. In both the recording/reproducing apparatuses 3000 and 4000, the magnetic head and the laser irradiating section need to be provided on the upper and lower sides of the recording medium, respectively. For that reason, it is impossible to provide heads on the upper and lower sides of a disk and utilize both sides of the disk as recording surfaces. In terms of space-saving, such a structure is disadvantageous to the recording/reproducing apparatus.

Further, the magnetic head needs to be moved to a target position on a recording medium for recording or reproducing. In addition to the above-described problems, the higher the density of recording, the greater the difficulty in servo tracking when only one magnetic head driving section is provided in a conventional recording/reproducing apparatus.

SUMMARY OF THE INVENTION

According to a first aspect of the present invention, a magnetic head for reproducing a signal recorded on a recording medium, includes a substrate; a magnetic head core provided on the substrate, having a magnetic gap; and a first magnetoresistance device provided on the magnetic head core. The magnetic head core is provided in such a manner that a thickness direction of the magnetic head core around the magnetic gap is substantially the same as a track width direction of the recording medium.

In one embodiment of this invention, the magnetic head further includes a second magnetoresistance device provided on the magnetic head core. The first magnetoresistance device and the second magnetoresistance device are provided symmetrically with respect to the magnetic gap.

In one embodiment of this invention, the magnetic head further includes a coil. The coil is provided in such a manner that at least a portion of the magnetic head core is surrounded by the coil; and a signal is recorded onto the recording medium by a magnetic field from the magnetic head core generated by the coil.

In one embodiment of this invention, the first magnetoresistance device includes a first insulating layer provided on the magnetic head core; and a first pinned layer provided on a side opposite to the magnetic head core of the first insulating layer, in which a magnetization direction is not easily rotated in the first pinned layer. The magnetic head core includes a first soft magnetic layer provided at a position corresponding to the first insulating layer; and the first soft magnetic layer functions as a first free layer of the first magnetoresistance device, in which a magnetization direction is easily rotated in the first free layer.

In one embodiment of this invention, the second magnetoresistance device includes a second insulating layer provided on the magnetic head core; and a second pinned layer provided on a side opposite to the magnetic head core of the second insulating layer, in which a magnetization direction is not easily rotated in the second pinned layer. The magnetic head core includes a second soft magnetic layer provided at a position corresponding to the second insulating layer; and the second soft magnetic layer functions as a second free layer of the second magnetoresistance device, in which a magnetization direction is easily rotated in the second free layer.

In one embodiment of this invention, the first soft magnetic layer and the second soft magnetic layer are the same soft magnetic layer.

In one embodiment of this invention, the magnetic head further includes a laser condenser for heating a region of the recording medium in the vicinity of the magnetic gap.

In one embodiment of this invention, the substrate functions as the laser condenser.

In one embodiment of this invention, the laser condenser includes a diffraction optical device.

In one embodiment of this invention, the diffraction optical device is a Fresnel lens.

In one embodiment of this invention, the magnetic head core includes at least one of NiFe(—Co), CoFe, CoFeB and CoNbZr.

In one embodiment of this invention, the first pinned layer includes Co or CoFe pinned by PtMn, IrMn, or NiMn.

In one embodiment of this invention, the second pinned layer includes Co or CoFe pinned by PtMn, IrMn, or NiMn.

According to a second aspect of the present invention, a recording/reproducing apparatus includes a magnetic head according to the first aspect of the present invention; and a recording medium including a first magnetic layer.

In one embodiment of this invention, the first magnetic layer has a compensation temperature and a Curie temperature.

In one embodiment of this invention, the compensation temperature is in the range between room temperature and about 100° C., and the Curie temperature is in the range between about 200° C. and about 300° C.

In one embodiment of this invention, the first magnetic layer includes a second magnetic layer for recording and a third magnetic layer for reproducing.

In one embodiment of this invention, the recording medium includes magnetic film micro dots magnetically separated from each other.

In one embodiment of this invention, the recording medium is a vertical magnetic storage medium.

In one embodiment of this invention, the recording medium is a disk.

In one embodiment of this invention, the recording medium is a tape.

In one embodiment of this invention, the recording/reproducing apparatus further includes a support for supporting the substrate; a first driving section for driving the support; and a second driving section for providing a movement of the magnetic head, provided on the substrate.

In one embodiment of this invention, the second driving section includes a thin film; and a movement of the magnetic head is provided by displacement of the thin film in a thickness direction thereof.

In one embodiment of this invention, the second driving section is driven by a piezoelectric system, an electrostatic system, or an electromagnetic system.

In one embodiment of this invention, the recording/reproducing apparatus further includes a plurality of the magnetic heads. The plurality of the magnetic heads are simultaneously driven by the first driving section.

In one embodiment of this invention, the first magnetic layer includes at least one of CoCr, CoPt, CoCrPt, CoCrTa, CoTaCrPt, FePt, TbFe, TbFeCo, and GdFeCo.

In one embodiment of this invention, the second magnetic layer includes TbFe or TbFeCo; and the third magnetic layer includes GdFeCo.

According to a third aspect of the present invention, a magnetic head for reproducing a signal recorded on a recording medium, includes a substrate; a magnetic head core provided on the substrate, having a magnetic gap; and a first magnetoresistance device provided on the magnetic head core. The first magnetoresistance device includes a first insulating layer provided on the magnetic head core; and a first pinned layer provided on a side opposite to the magnetic head core of the first insulating layer, in which a magnetization direction is not easily rotated in the first pinned layer. The magnetic head core includes a first soft magnetic layer provided at a position corresponding to the first insulating layer; and the first soft magnetic layer functions as a first free layer of the first magnetoresistance device, in which a magnetization direction is easily rotated in the first free layer.

In one embodiment of this invention, the magnetic head further includes a second magnetoresistance device provided on the magnetic head core. The second magnetoresistance device includes a second insulating layer provided on the magnetic head core; and a second pinned layer provided on a side opposite to the magnetic head core of the second insulating layer, in which a magnetization direction is not easily rotated in the second pinned layer. The magnetic head core includes a second soft magnetic layer provided at a position corresponding to the second insulating layer; and the second soft magnetic layer functions as a second free layer of the second magnetoresistance device, in which a magnetization direction is easily rotated in the second free layer.

In one embodiment of this invention, the first magnetoresistance device and the second magnetoresistance device are provided symmetrically with respect to the magnetic gap.

In one embodiment of this invention, the first soft magnetic layer and the second soft magnetic layer are the same soft magnetic layer.

In one embodiment of this invention, the magnetic head further includes a coil. The coil is provided in such a manner that at least a portion of the magnetic head core is surrounded by the coil; and a signal is recorded on the recording medium by a magnetic field from the magnetic head core generated by the coil.

In one embodiment of this invention, the magnetic head further includes a laser condenser for heating a region of the recording medium in the vicinity of the magnetic gap.

In one embodiment of this invention, the substrate functions as the laser condenser.

In one embodiment of this invention, the laser condenser includes a diffraction optical device.

In one embodiment of this invention, the diffraction optical device is a Fresnel lens.

In one embodiment of this invention, the magnetic head core includes at least one of NiFe(—Co), CoFe, CoFeB and CoNbZr.

In one embodiment of this invention, the first pinned layer includes Co or CoFe pinned by PtMn, IrMn, or NiMn.

In one embodiment of this invention, the second pinned layer includes Co or CoFe pinned by PtMn, IrMn, or NiMn.

According to a fourth aspect of the present invention, a recording/reproducing apparatus includes a magnetic head according to the third aspect of the present invention; and a recording medium comprising a first magnetic layer.

In one embodiment of this invention, the first magnetic layer has a compensation temperature and a Curie temperature.

In one embodiment of this invention, the compensation temperature is in the range between room temperature and about 100° C., and the Curie temperature is in the range between about 200° C. and about 300° C.

In one embodiment of this invention, the first magnetic layer includes a second magnetic layer for recording and a third magnetic layer for reproducing.

In one embodiment of this invention, the recording medium includes magnetic film micro dots magnetically separated from each other.

In one embodiment of this invention, the recording medium is a vertical magnetic storage medium.

In one embodiment of this invention, the recording medium is a disk.

In one embodiment of this invention, the recording medium is a tape.

In one embodiment of this invention, the recording/reproducing apparatus further includes a support for supporting the substrate; a first driving section for driving the support; and a second driving section for providing a movement of the magnetic head, provided on the substrate.

In one embodiment of this invention, the second driving section includes a thin film; and a movement of the magnetic head is provided by displacement of the thin film in a thickness direction thereof.

In one embodiment of this invention, the second driving section is driven by a piezoelectric system, an electrostatic system, or an electromagnetic system.

In one embodiment of this invention, the recording/reproducing apparatus further includes a plurality of the magnetic heads. The plurality of the magnetic heads are simultaneously driven by the first driving section.

In one embodiment of this invention, the first magnetic layer includes at least one of CoCr, CoPt, CoCrPt, CoCrTa, CoTaCrPt, FePt, TbFe, TbFeCo, and GdFeCo.

In one embodiment of this invention, the second magnetic layer includes TbFe or TbFeCo; and the third magnetic layer includes GdFeCo.

According to a fifth aspect of a magnetic head for reproducing a signal recorded on a recording medium, includes a substrate; a magnetic head core provided on the substrate, having a magnetic gap; and a coil provided in such a manner that at least a portion of the magnetic head core is surrounded by the coil. A signal is recorded on the recording medium by a magnetic field from the magnetic head core generated by the coil; and the magnetic head core is provided in such a manner that a thickness direction of the magnetic head core around the magnetic gap is substantially the same as a track width direction of the recording medium.

According to a sixth aspect of the present invention, a recording/reproducing apparatus includes a first magnetic head for recording a signal onto a recording medium; and a second magnetic head for reproducing the signal recorded on the recording medium. The first magnetic head includes a first substrate; a first magnetic head core provided on the first substrate, having a first magnetic gap; and a coil provided in such a manner that at least a portion of the magnetic head core is surrounded by the coil. The first magnetic head core is provided in such a manner that a thickness direction of the first magnetic head core around the first magnetic gap is substantially the same as a track width direction of the recording medium. The second magnetic head includes a second substrate; a second magnetic head core provided on the second substrate, having a second magnetic gap; and a first magnetoresistance device provided on the second magnetic head core. The second magnetic head core is provided in such a manner that a thickness direction of the second magnetic head core around the second magnetic gap is substantially the same as a track width direction of the recording medium.

In one embodiment of this invention, the first substrate and the second substrate are the same substrate.

In one embodiment of this invention, the recording/reproducing apparatus further includes a second magnetoresistance device provided on the second magnetic head core. The first magnetoresistance device and the second magnetoresistance device are provided symmetrically with respect to the second magnetic gap.

According to a seventh aspect of the present invention, a recording/reproducing apparatus includes a first magnetic head for recording a signal onto a recording medium; and a second magnetic head for reproducing the signal recorded on the recording medium. The first magnetic head includes a first substrate; a first magnetic head core provided on the first substrate, having a first magnetic gap; and a coil provided in such a manner that at least a portion of the magnetic head core is surrounded by the coil. The first magnetic head core is provided in such a manner that a thickness direction of the first magnetic head core around the first magnetic gap is substantially the same as a track width direction of the recording medium. The second magnetic head includes a second substrate; a second magnetic head core provided on the second substrate, having a second magnetic gap; and a first magnetoresistance device provided on the second magnetic head core. The first magnetoresistance device includes an insulating layer provided on the second magnetic head core; and a pinned layer provided on a side opposite to the second magnetic head core of the insulating layer, in which a magnetization direction is not easily rotated in the pinned layer. The second magnetic head core includes a soft magnetic layer provided at a position corresponding to the second insulating layer; and the soft magnetic layer functions as a free layer of the first magnetoresistance device, in which a magnetization direction is easily rotated in the free layer.

In one embodiment of this invention, the first substrate and the second substrate are the same substrate.

In one embodiment of this invention, the recording/reproducing apparatus further includes a second magnetoresistance device provided on the second magnetic head core. The first magnetoresistance device and the second magnetoresistance device are provided symmetrically with respect to the second magnetic gap.

Thus, the invention described herein makes possible the advantages of providing hyper-density recording of about 100 Gb/inch$^2$, and a recording/reproducing apparatus incorporating a magnetic head driving portion having a high-accuracy tracking performance in such hyper-density recording.

These and other advantages of the present invention will become apparent to those skilled in the art upon reading and understanding the following detailed description with reference to the accompanying figures.

BRIEF DESCRIPTION OF THE DRAWINGS

FIG. 6 is a perspective view illustrating the example of the recording medium of Example 5.

DESCRIPTION OF THE PREFERRED EMBODIMENTS

EXAMPLE 1

Figure 1A:
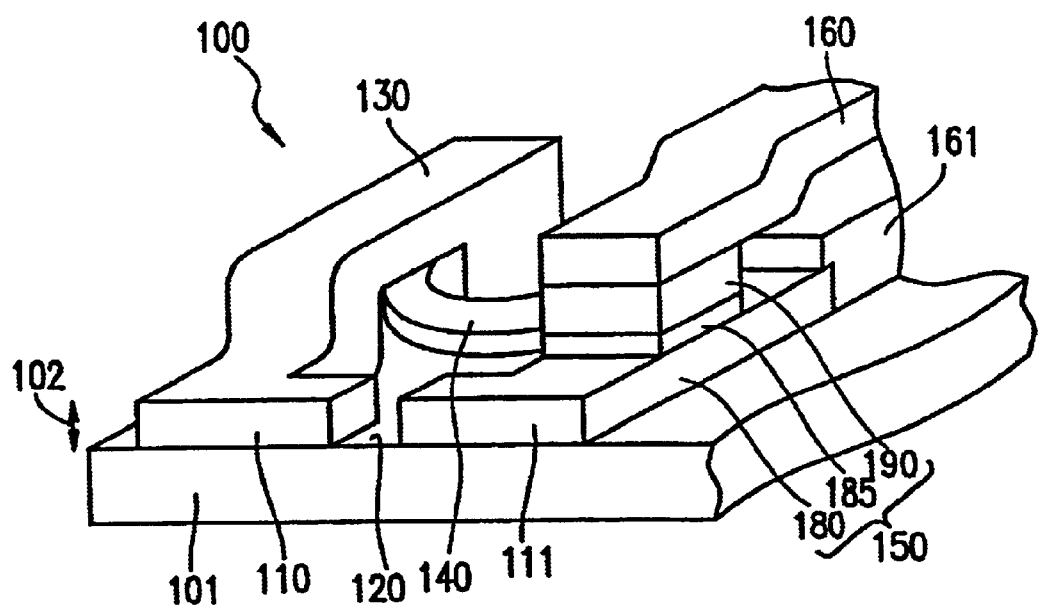
FIG. 1A is a perspective view illustrating a magnetic head according to Example 1 of the present invention.
Figure 1B:
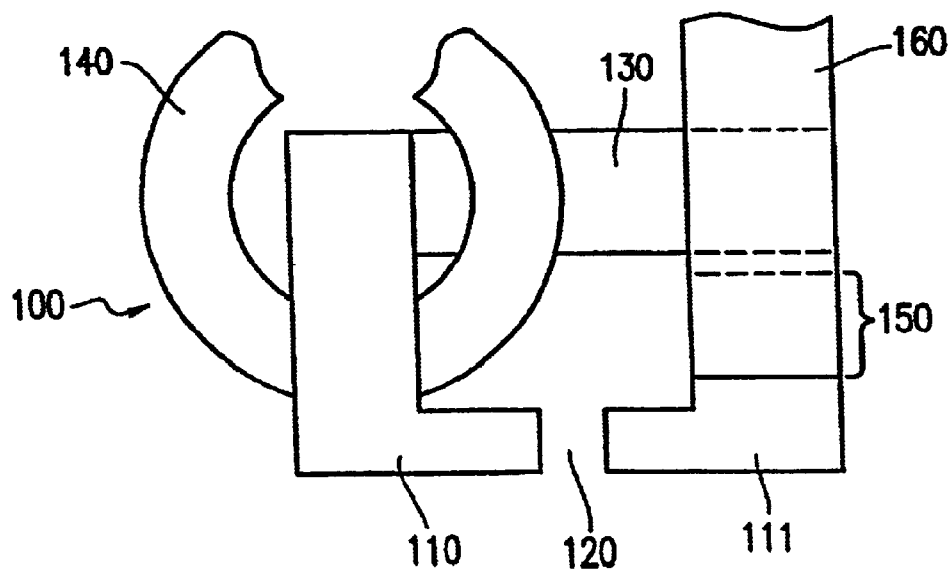
FIG. 1B is a plan view illustrating the magnetic head of Example 1.

FIGS. 1A and 1B show a magnetic head 100 according to Example 1 of the present invention. FIG. 1A is a perspective view of the magnetic head 100. FIG. 1B is a plan view of the magnetic head 100. The magnetic head 100 includes a magnetic head core 130, a coil portion 140, and a magnetoresistance device 150 which are provided on a substrate 101. The magnetic head core 130 includes soft magnetic films 110 and 111, and a magnetic gap 120. The coil portion 140 generates a magnetic field in the magnetic head core 130 to write a signal onto a recording medium 116 (FIG. 5). The magnetoresistance device 150 reads a magnetic flux from the recording medium 116.

When recording onto the recording medium 116, a magnetic field is generated in the magnetic head core 130 by the coil portion 140 in accordance with a signal to be recorded. The generated magnetic field is applied to a magnetic layer 117 (FIG. 5) of the recording medium 116.

When reproducing from the recording medium 116, a magnetic flux is conducted from the magnetic layer 117 of the recording medium 116 through the magnetic gap 120, the soft magnetic films 110 and 111, to the magnetoresistance device 150. The soft magnetic films 110 and 111 are provided on the substrate 101. The thickness direction 102 of the soft magnetic films 110 and 111 is the same as the track width direction 112 of the recording medium 116.

The magnetoresistance device 150 shown in FIG. 1 is a tunnel-type magnetoresistance (TMR) device. The magnetoresistance device 150 includes a free layer 180, a pinned layer 190, and an insulating layer 185. The free layer 180 is made of a magnetic film in which a magnetization direction thereof is easily rotated. The pinned layer 190 is made of a magnetic film in which a magnetization direction thereof is not easily rotated. The insulating film 185 isolates the free layer 180 from the pinned layer 190. The magnetic head 100 includes lead line portions 160 and 161 for causing a current to flow through the magnetoresistance device 150.

In the magnetic head 100 of this example, the soft magnetic film 111 included in the magnetic head core 130 also serves as a region of the free layer 180 included in the magnetoresistance device 150. Although the magnetoresistance device 150 shown in FIG. 1 has the TMR device structure, the insulating film 185 included in the magnetoresistance device 150 may be replaced with a conductive metal film. Such a GMR device structure can cause the magnetic head 100 of Example 1 to be practicable.

In the magnetoresistance device 150 shown in FIG. 1, the insulating film 185 isolates the free layer 180 from the pinned layer 190, and the soft magnetic film 111 serves as a region of the free layer 180. For that reason, the magnetoresistance device 150 can more efficiently detect a magnetic flux from the recording medium 116. In general, the TMR device structure exhibits a larger change in magnetoresistance than that of the metal GMR device structure, whereby the output of the magnetoresistance device 150 is also larger. Further, when the gap portion is not taken into account and the circuit is regarded as a closed magnetic circuit, a signal magnetic flux can be efficiently conducted into the free layer 180 of the magnetoresistance device 150.

In the magnetic head 100 of Example 1, the soft magnetic films 110 and 111 constituting part of the magnetic head core 130 are provided on the substrate 101 in such a way that the thickness direction 102 thereof is the same as the track width direction of the recording medium 116. This allows fabrication of the magnetic head such that the track width is about 0.1 $\mu$m or less, which size is conventionally difficult to obtain.

The soft magnetic films 110 and 111 and the free layer 180 constituting the magnetic head core 130 are preferably made of a Ni-rich NiFe(—Co) film or a CoFe alloy film, or an amorphous alloy film such as CoFeB and CoNbZr, or a lamination film of a combination thereof. More preferably, CoFe or NiFe having a large MR ratio (the rate of a change in magnetoresistance) is provided at an interface between the free layer 180 and the isolating layer 185. The isolating layer 185 is preferably made of $Al_2O_3$. The pinned layer 190 is preferably made of a material in which a magnetic film having a large coercive film or a metal film such as Co and CoFe is pinned by an antiferromagnetic film made of a T(Pt, Ir, Ni, Pd, Rh, Rn, Cr)—Mn based alloy such as PtMn, IrMn, and NiMn.

EXAMPLE 2

Figure 2:
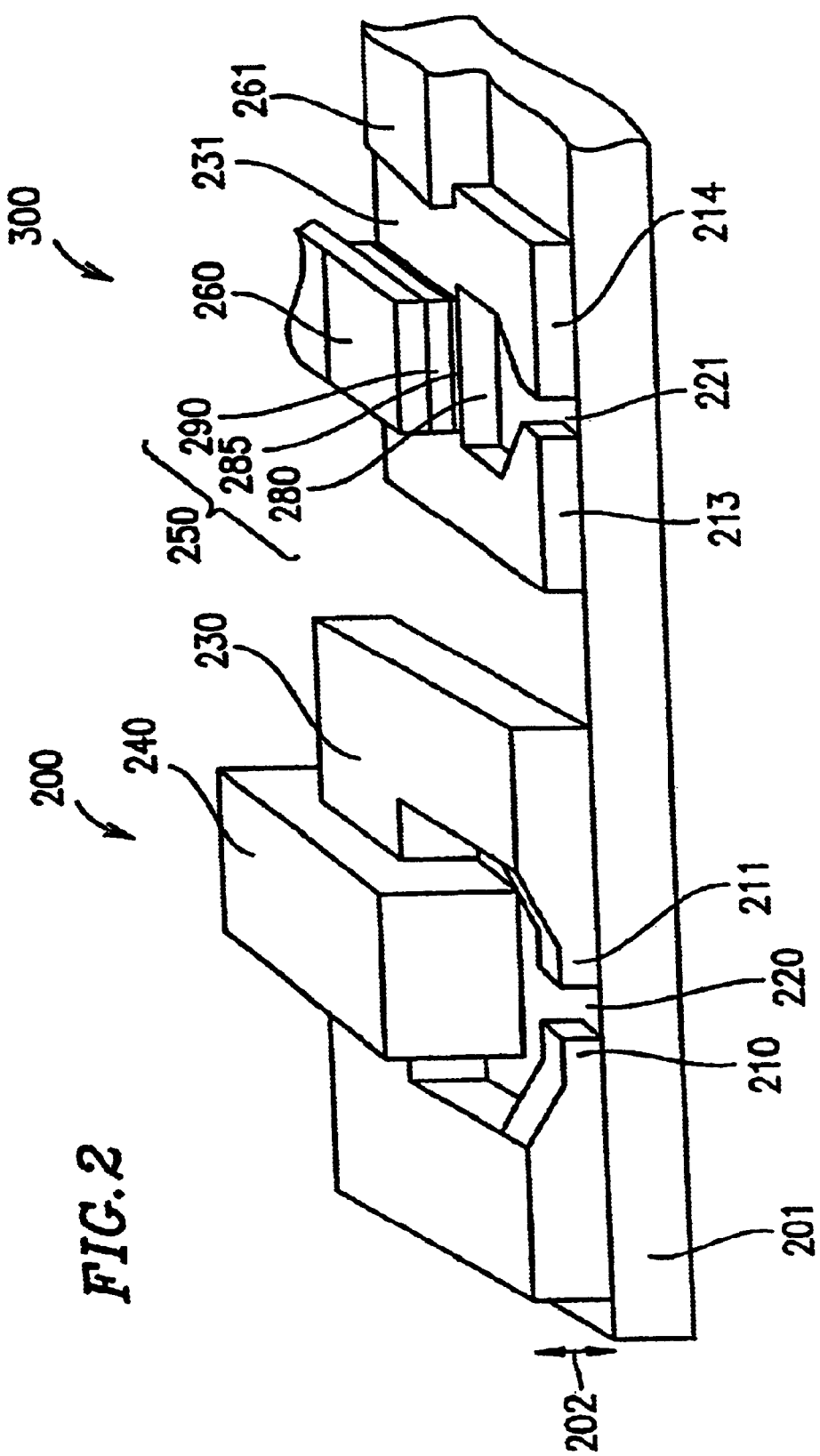
FIG. 2 is a perspective view illustrating a magnetic head according to Example 2 of the present invention.

FIG. 2 is a perspective view of magnetic heads 200 and 300 according to Example 2 of the present invention.

In the above-described magnetic head 100 of Example 1, the single magnetic head is used in both recording and reproducing. On the other hand, in Example 2, the magnetic head 200 having a coil portion 240 which is used for recording and the magnetic head 300 having a magnetoresistance device 250 which is used for reproducing are separately provided on a substrate 201.

Figure 5A:
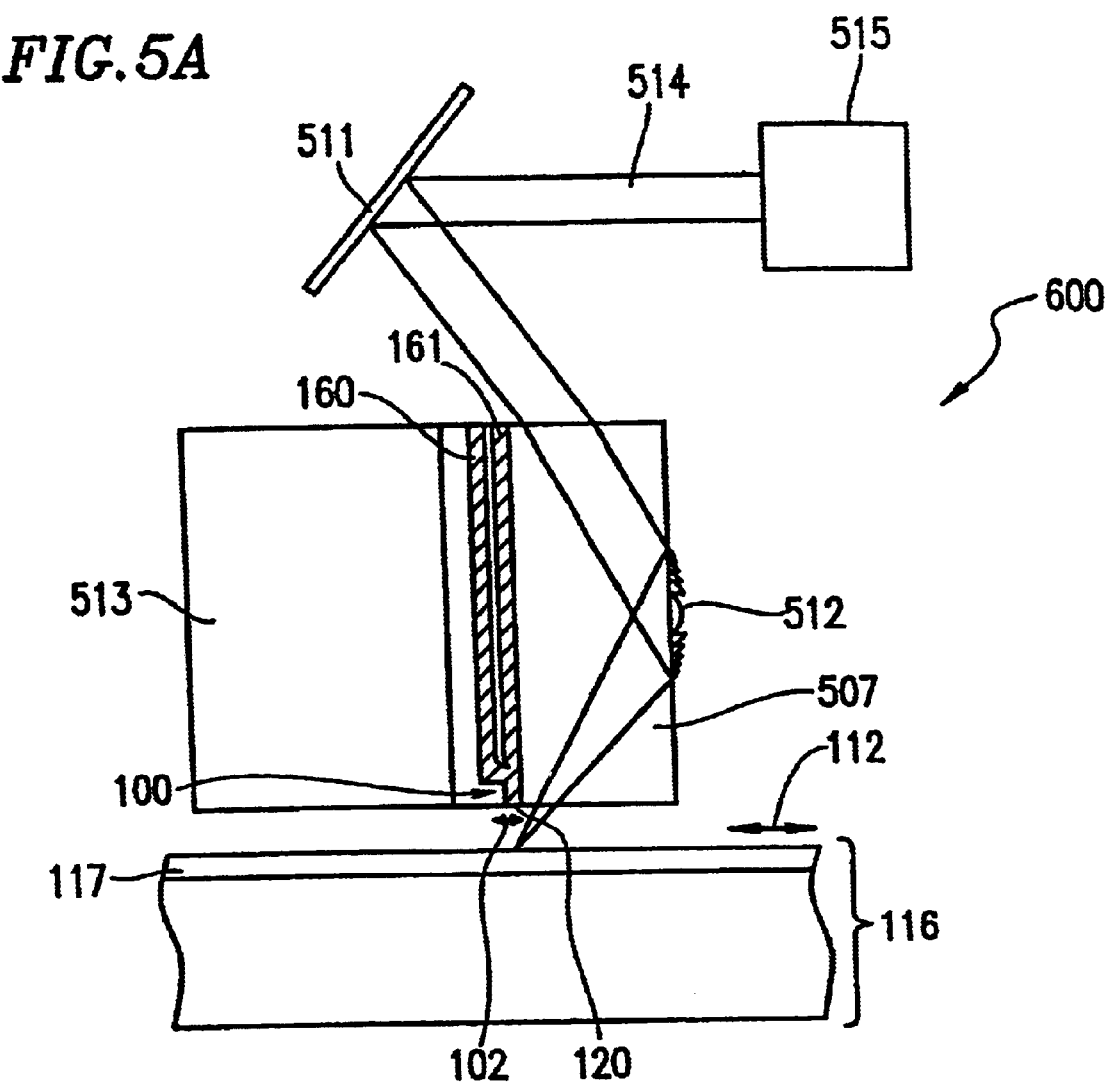
FIG. 5A is a cross-sectional view illustrating a recording/reproducing apparatus according to Example 5 of the present invention.

The magnetic head 200 includes a magnetic head core 230 and the coil portion 240. The magnetic head core 230 is provided on the substrate 201 and has a magnetic gap 220. The coil portion 240 generates a magnetic flux in the magnetic head core 230 for writing a signal onto the recording medium 116 (FIG. 5A).

The magnetic head 300 includes a magnetic head core 231 and the magnetoresistance device 250. The magnetic head core 231 is provided on the substrate 201 and has a magnetic gap 221. The magnetoresistance device 250 reads a magnetic flux from the recording medium 116.

When recording into the recording medium 116, a magnetic field is generated in the magnetic head core 230 by the coil portion 240 in accordance with a signal to be recorded. The generated magnetic field is applied to the magnetic layer 117 of the recording medium 116.

When reproducing from the recording medium 116, a magnetic flux is conducted from the magnetic layer 117 of the recording medium 116 through the magnetic gap 221, soft magnetic films 213 and 214, and to the magnetoresistance device 250.

The magnetoresistance device 250 includes a free layer 280, a pinned layer 290, and an insulating layer 285. The free layer 280 is made of a magnetic film in which a magnetization direction thereof is easily rotated. The pinned layer 290 is made of a magnetic film in which a magnetization direction thereof is not easily rotated. The insulating film 285 isolates the free layer 280 from the pinned layer 290. The magnetic head 300 includes lead line portions 260 and 261 for causing current to flow through the magnetoresistance device 250.

Similar to Example 1, in the magnetic head 300 of Example 2, the soft magnetic film 214 included in the magnetic head core 231 also serves as a region of the free layer 280 included in the magnetoresistance device 250. The soft magnetic films 210, 211, 213, and 214 are provided on the substrate 201. The thickness direction 202 of soft magnetic films 210 and 211 included in the magnetic head 200 as well as the soft magnetic films 213 and 214 included in the magnetic head 300 is the same as the track width direction 112 (FIG. 5) of the recording medium 116.

In Example 2, the magnetic head 200 for recording and the magnetic head 300 for reproducing are separately provided on the substrate 201. Components have different sizes between the magnetic heads 200 and 300. For example, the thickness of the magnetic head core 230 of the magnetic head 200 for recording may be larger than the thickness of the magnetic head core 231 of the magnetic head 300 for reproducing in the thickness direction 202. The width of the magnetic gap 220 may be different from the width of the magnetic gap 221. The size of each component preferably may be modified to further improve recording/reproducing characteristics.

Alternatively, the magnetic heads 200 and 300 do not need to be provided on the same substrate, but may be provided on separate substrates.

EXAMPLE 3

Figure 3:
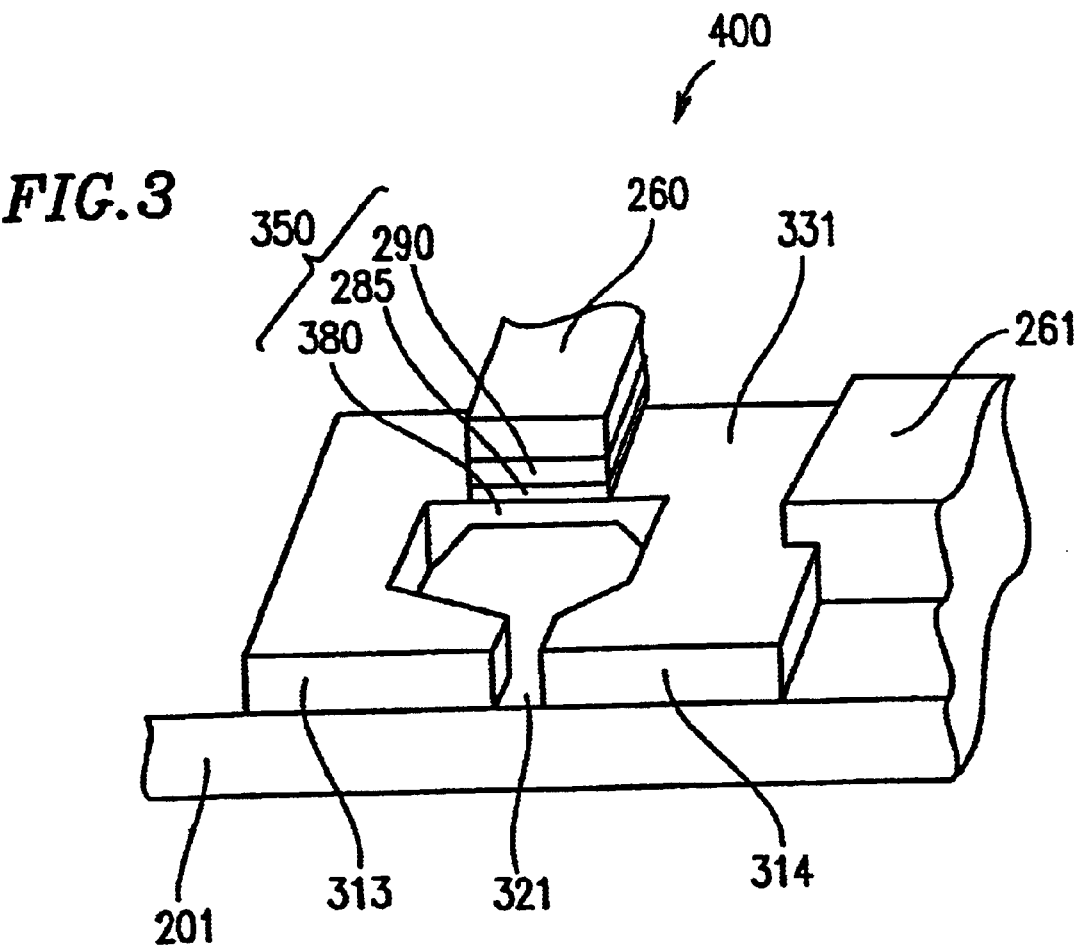
FIG. 3 is a perspective view illustrating a magnetic head according to Example 3 of the present invention.

FIG. 3 is a perspective view of a magnetic head 400 according to Example 3 of the present invention. The magnetic head 400 includes a magnetic head core 331 and a magnetoresistance device 350 which are provided on a substrate 201. The magnetic head core 331 includes soft magnetic films 313 and 314. The magnetoresistance device 350 includes a free layer 380, a pinned layer 290, and an insulating layer 285. The insulating layer 285 isolates the free layer 380 from the pinned layer 290. The other structure of the magnetic head 400 is the same as the corresponding structure of the magnetic head 300 of Example 2.

In Example 3, the thickness of a region serving as the free layer 380 of the magnetoresistance device 350 of the magnetic head core 331 and a surrounding region thereof is smaller than the thickness of the other region of the magnetic head core 331. For that reason, a magnetic flux flowing through the magnetic head core 331 is converged into the free layer 380 so that the density of the magnetic flux is increased, thereby improving the reproducing sensitivity of the magnetoresistance device 350.

EXAMPLE 4

Figure 4:
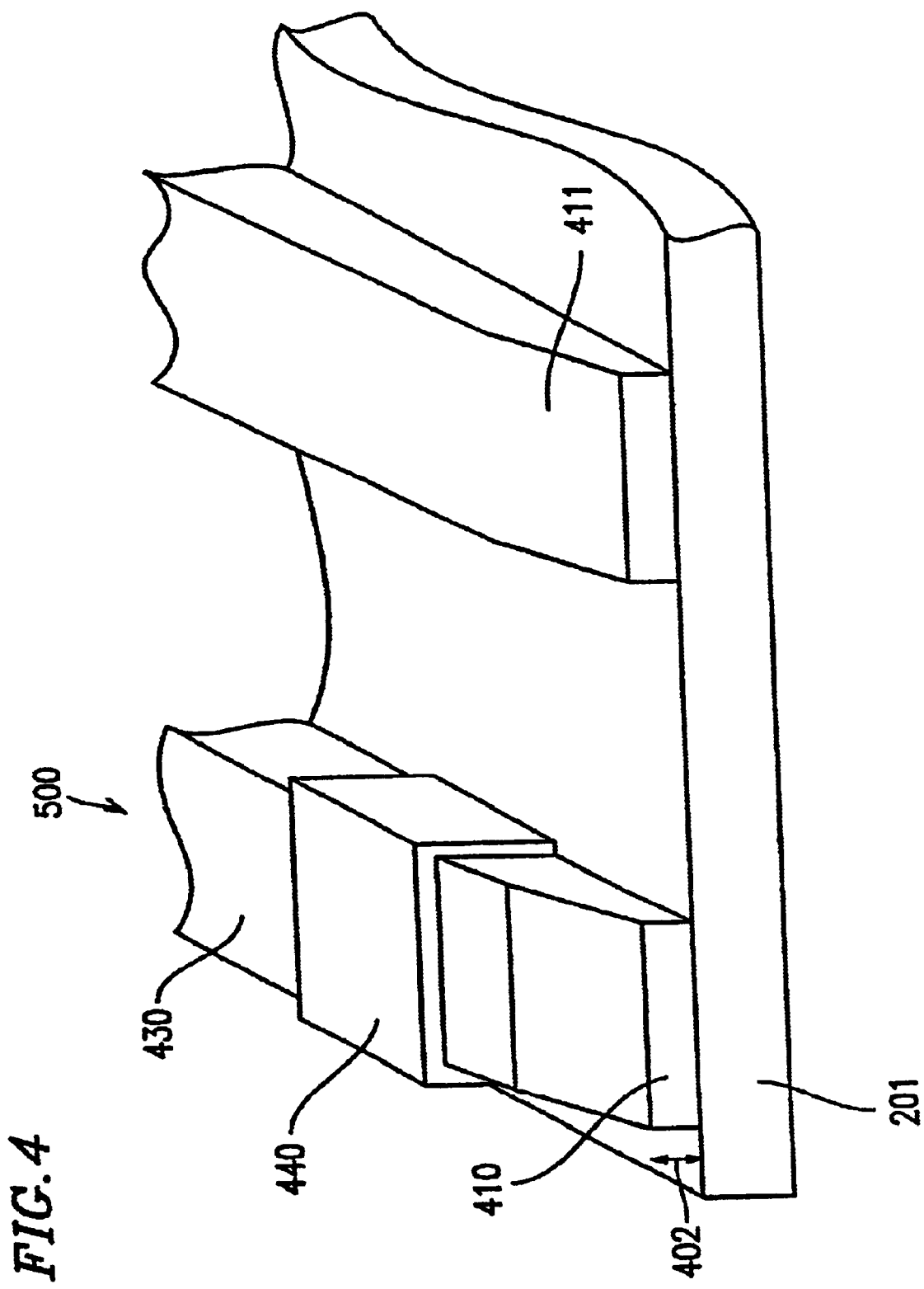
FIG. 4 is a perspective view illustrating a magnetic head according to Example 4 of the present invention.

FIG. 4 is a perspective view of a magnetic head 500 according to Example 4 of the present invention. The magnetic head 500 has a magnetic monopole type head structure and is used for recording on a vertical recording medium. The magnetic head 500 includes a magnetic head core 430 and a coil portion 440 which are provided on a substrate 201. The magnetic head core 430 includes a region 410 opposed to the recording medium 116. The thickness direction 402 of the region 410 is the same as the track width direction 112 (FIG. 5) of the recording medium 116. Preferably, the thickness of the region 410 is the same as the track width of the recording medium 116. The coil portion 440 generates a magnetic field in the magnetic head core 430 to write a signal onto a recording medium 116.

The magnetic head 500 may include a return yoke portion 411 so as to improve the recording efficiency of the magnetic head 500. Preferably, the return yoke portion 411 is magnetically coupled to the magnetic head core 430, serving as part of the magnetic head core 430.

EXAMPLE 5

Figure 5B:
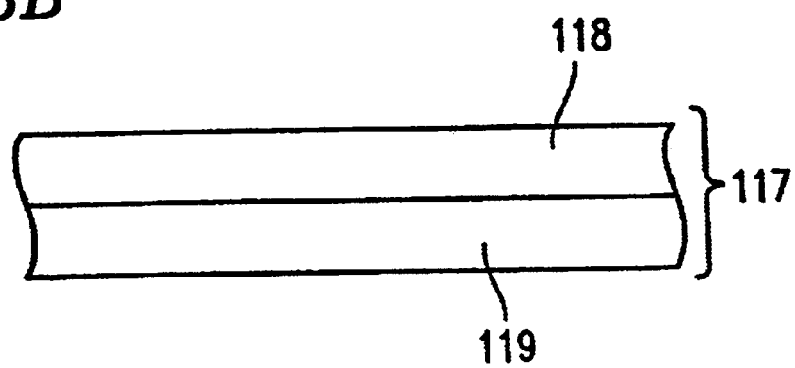
FIG. 5B is a cross-sectional view illustrating an example of a recording medium according to Example 5 of the present invention.

FIG. 5A is an elevation view of a recording/reproducing apparatus 600 according to Example 5 of the present invention. FIG. 5B is a cross-sectional view of a magnetic layer 117 provided in the recording medium 116. The recording/reproducing apparatus 600 shown in FIG. 5A includes the magnetic head 100 shown in Example 1, the recording medium 116, a laser condenser 507, and a slider 513. The laser condenser 507 is integrated with the magnetic head 100 and used for heating the recording medium 116 in the vicinity of the magnetic head gap 120. The slider 513 supports the magnetic head 100.

In the recording/reproducing apparatus 600 shown in FIG. 5A, although the magnetic head 100 of Example 1 is used, the magnetic head 200, 300, 400, or 500 may be available. The recording medium 116 is preferably a disk or tape.

The laser condenser 507 may be constructed by incorporating a hemispherical SIL lens, a diffraction optical device (e.g., a micro Fresnel lens), or the like, to the magnetic head 100. The laser condenser 507 shown in FIG. 5A is also used as the substrate 101 of the magnetic head 100. The laser condenser 507 is made of a material which is transparent to laser light 514 from a laser light source 515. The laser light 514 is reflected by a mirror 511 and then gathered in the vicinity of the magnetic gap 120 by a diffraction optical device 512 (e.g., a micro Fresnel lens). Since the laser condenser 507 also serves as the substrate 101 of the magnetic head 100, it is easier to integrate the laser condenser 507 with the magnetic head 100.

Specifically, optical glass is used as the substrate 101. The optical glass is processed into a micro Fresnel lens. A metal reflection film made of Ag or the like is thereafter provided on a surface of the micro Fresnel lens. Thus, the laser condenser 507 is obtained.

Figure 13:
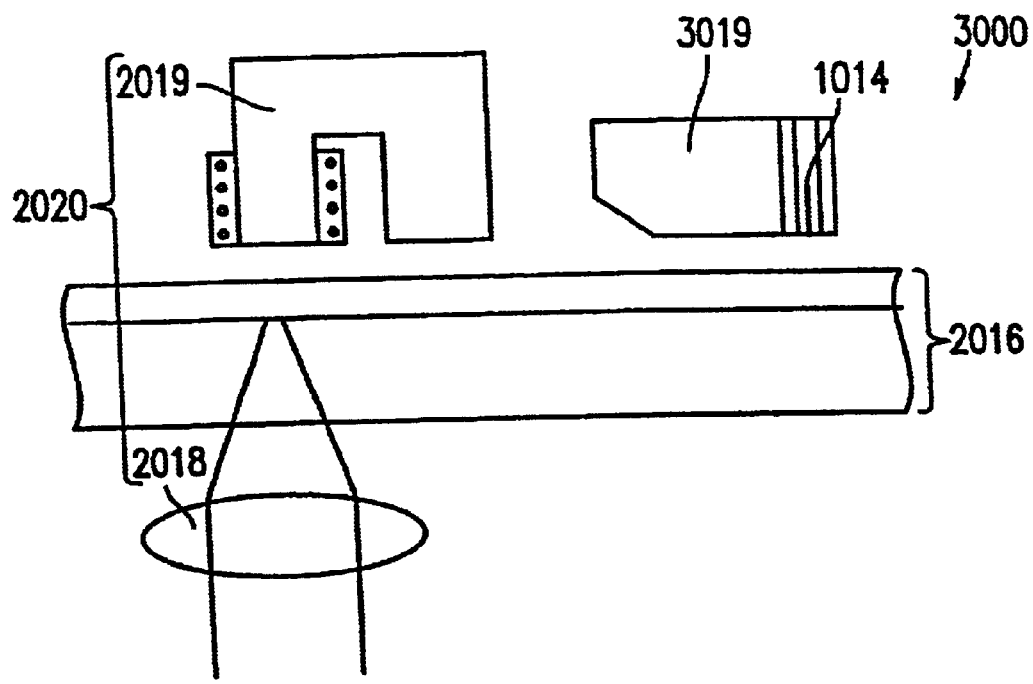
FIG. 13 is a cross-sectional view illustrating a conventional recording/reproducing apparatus.
Figure 14:
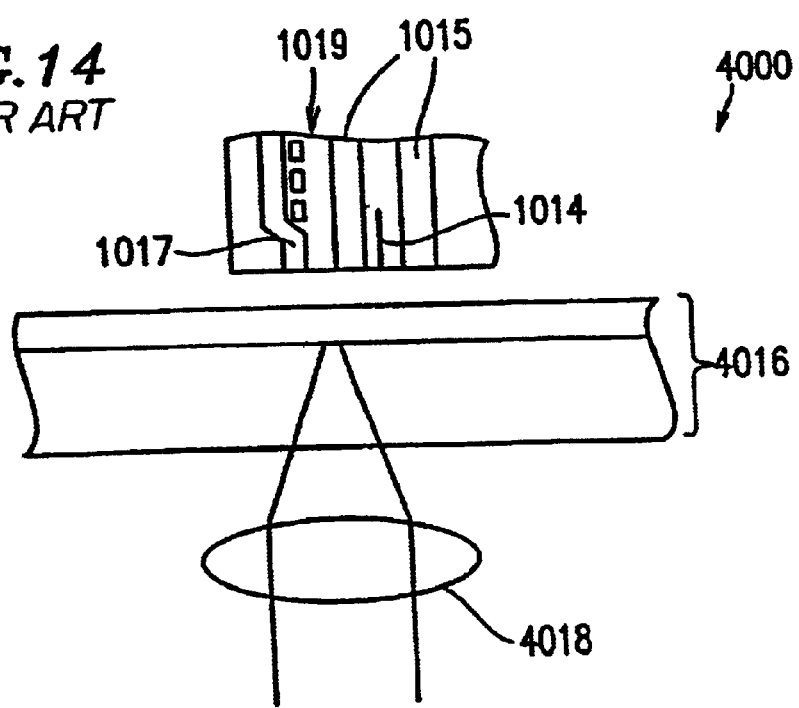
FIG. 14 is a cross-sectional view illustrating a conventional recording/reproducing apparatus.

In this way, the magnetic head 100 can have the built-in laser condenser 507. This is because the thickness direction 102 of the magnetic head 100 is the same as the track width direction 112. This allows the substrate 101 to be also used as the laser condenser 507. Also, the hemispherical SIL lens, the diffraction optical device, or the like can be incorporated with the magnetic head 100. Such a structure cannot be realized in terms of geometry in the conventional case when the thickness direction of a magnetic head is perpendicular to the track width direction. In the conventional geometry, two magnetic heads are required as shown in FIGS. 13 and 14, or the laser condenser and the magnetic head need to be separately provided on the upper and lower sides of the recording medium.

Although the recording/reproducing apparatus 600 shown in FIG. 5A includes a slider 513, the substrate 101 may also function as the slider. The laser light 514 may be guided by an optical fiber to the laser condenser 507. The recording/reproducing apparatus 600 may omit the laser condenser 507 when the magneto-optical recording is not performed but only the magnetic recording is performed.

The magnetic layer 117 of the recording medium 116 is made of a material having a compensation temperature and a Curie temperature. For example, an amorphous film made of a rare earth metal and a transition metal is used as the magnetic layer 117. The magnetic layer 117 does not need to exhibit the Kerr effect, as is different from typical magneto-optical recording.

When the magnetic layer 117 is a single-layer film, the magnetic layer 117 needs to have a property such that is the coercive force is great at room temperature without irradiation of the laser light 514 and the coercive force is decreased at an increased temperature due to irradiation of the laser light 514. Upon reproduction, the magnetic layer 117 is, if necessary, irradiated with the laser light 514 and reading is performed by the magnetoresistance device. In this case, the magnetic layer 117 preferably has a property such that an increased temperature due to the irradiation of the laser light 514 causes an increase in magnetization of the magnetic layer 117, thereby increasing a leakage magnetic field from the recording medium 116.

As shown in FIG. 5B, the magnetic layer 117 may be a two-layer film including a magnetic layer 119 for recording which has a great coercive force at room temperature and a magnetic layer 118 for reproducing which is magnetically coupled with the magnetic layer 119 and has significant magnetization at room temperature.

The above-described conditions are satisfied in the following way. In the case of the single-layer magnetic layer 117, the magnetic layer 117 is preferably made of a magnetic film for a recording medium which has a compensation temperature of room temperature, or between room temperature and about 100° C. and which has a Curie temperature of about 200–300° C. The compensation temperature and the Curie temperature are important for recording and reproducing, respectively.

In the case of the two-layer magnetic layer 117, the compensation point of the magnetic layer 119 for recording is preferably between room temperature and about 100° C. The magnetic layer 118 for reproducing preferably has a relatively high Curie temperature so that the layer 118 exhibits significant magnetization at a temperature upon the laser irradiation. When the magnetic layer 118 for reproducing has a very high Curie temperature, if the magnetic layer 119 for recording has a low Curie temperature, the resulting magnetic layer 117 is not satisfactory. The magnetic layer 117 needs to have good balance between the properties of the magnetic layers 118 and 119.

Specifically, the magnetic layer 119 for recording is preferably made of a TbFe film in which the coercive force is great at room temperature and the compensation point can be set between room temperature and about 100° C. Alternatively, the magnetic layer 119 for recording is preferably made of a TbFeCo film or the like which has a Curie temperature higher than that of the TbFe film. The magnetic layer 118 for reproducing is preferably made of a GdFeCo film or the like which has a high Curie temperature and exhibits significant magnetization upon laser irradiation.

Alternatively, the magnetic layer 117 may be a conventional magnetic layer mainly made of a transition metal such as Fe and Co, e.g., mainly made of CoCr, CoPt, CoCrPt, CoCrTa, CoTaCrPt, FePt, or the like.

When the recording medium 116 is a vertical recording medium which can be recorded at room temperature, the assistance of the laser light 514 is not required. Using only the magnetic head 100, 200, or 500 shown in Examples 1 to 4, writing of information can be achieved.

When the recording medium 116 is made of a recording medium on which information cannot be easily recorded at room temperature, the recording medium 116 is irradiated by the laser light 514 or the like so as to increase the temperature thereof and decrease the coercive force before recording. The magnetic layer mainly made of a transition metal such as Fe and Co has significant magnetization at an increased temperature as well as room temperature, as is different from the above-described rare earth metal amorphous material. A signal on the recording medium 116 can be reproduced by the magnetoresistance device upon laser irradiation as well as at room temperature.

A vertical recording medium is more preferable than an in-plane recording medium when information is recorded on the recording medium using the magnetic head 100, 200, or 500. This is because the vertical recording medium has lesser fringing in the track width direction of a recording pattern as compared with the in-plane recording medium.

Referring to FIG. 6, a recording medium 616 has uniform micro dots 602 made of a magnetic film provided in a non-magnetic matrix 601. The micro dots 602 are magnetically isolated from each other by the non-magnetic matrix 601. As there is lesser fringing, the recording medium 616 is preferable.

The recording medium used in the present invention is preferably in the shape of a disk which allows random access. Alternatively, the recording medium is preferably a streaming tape for storing the backup of a hard disk.

The magnetic head of the present invention is also significantly effective when the recording medium used in the recording/reproducing apparatus of this invention is a tape. In this case, the track width of the tape is larger than that of a disk recording medium. The soft magnetic film used in the magnetic heads 100, 200, 300, 400, and 500 may be thick so as to correspond to the track width of the tape.

In the case of the yoke-type MR head including a conventional NiFe or GMR film, the reproducing efficiency is reduced unless the magnetoresistance device is positioned close to the tape medium. There is a problem in that when the magnetoresistance device contacts with the tape, the friction is large so that the magnetoresistance device wears away. The magnetic head of the present invention has a high level of reproducing efficiency, and it is possible to provide the magnetoresistance device at a considerable distance from the tape medium while the reproducing efficiency substantially is not reduced.

EXAMPLE 6

Figure 7A:
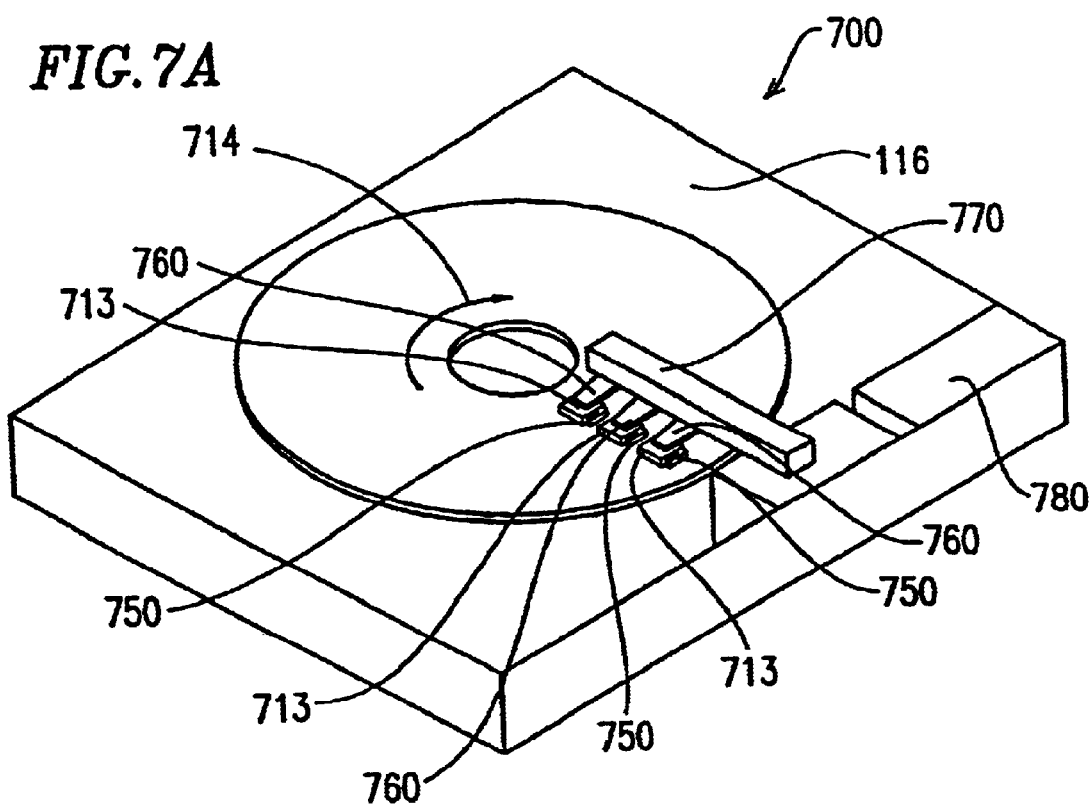
FIG. 7A is a perspective view illustrating a recording/reproducing apparatus according to Example 6 of the present invention.
Figure 7B:
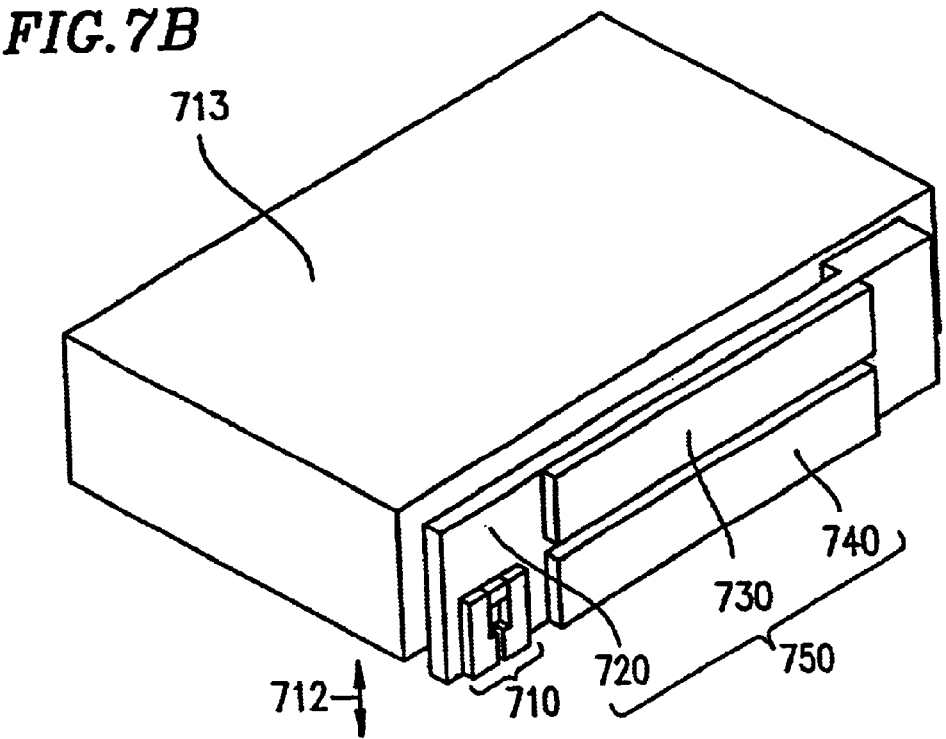
FIG. 7B is a perspective view illustrating a sub driving section according to Example 6 of the present invention.

FIG. 7A is a perspective view illustrating a recording/reproducing apparatus 700 according to Example 6 of the present invention. FIG. 7B is a perspective view illustrating a sub driving section 750 included in the recording/reproducing apparatus 700.

The recording/reproducing apparatus 700 includes the sub driving section 750, a slider 713, an arm 760, a main driving section 770, a recording medium 116, and a signal processing section 780. The sub driving section 750 includes a magnetic head 710. The slider 713 supports the sub driving section 750. The arm 760 supports the slider 713. The main driving section 770 drives the arm 760.

Any one of the magnetic heads 100, 200, 300, 400, and 500 shown in Examples 1 through 4 is used as the magnetic head 710. The main driving section 770 may adopt a linear driving arrangement. The recording medium 116 is in the shape of a disk and rotates in a direction indicated by an arrow 714.

As shown in FIG. 7B, the sub driving section 750 includes driving members 730 and 740, and a movable member 720. The movable member 720 is driven by the driving members 730 and 740. The magnetic head 710 is provided on the movable member 720.

In the recording/reproducing apparatus 700, the magnetic head 710 and the sub driving section 750 for accomplishing small movements of the magnetic head 710 are provided on the same surface. For that reason, the fabrication process of the magnetic head 710 and the fabrication process of the sub driving section 750 are carried out on the same substrate surface, thereby facilitating the fabrication processes. In this case, the substrate of the magnetic head 710 also serves as the movable member 720. Similarly, the laser condenser 507 may also serve as the movable member 720.

In the recording/reproducing apparatus 700, the driving members 730 and 740 and the movable member 720 are made of a thin film. The magnetic head 710 is easily driven in a tracking direction using a bend in the thickness direction of the thin film.

As shown in FIG. 7B, as a plurality of driving members (730 and 740) are provided, it is possible to accomplish small movements of the magnetic head 710 in the track width direction of the recording medium 116 as well as in a direction 712 perpendicular to the recording medium 116. Accordingly, a gap between the magnetic head 710 and the recording medium 116 can be controlled. The driving members 730 and 740 are realized by any one of a piezoelectric system, an electrostatic system, and an electromagnetic system. In particular, when piezoelectric members made of a thin film are used as the driving members 730 and 740, high-resolution tracking can be performed by driving the magnetic head 710 by a low voltage.

In the recording/reproducing apparatus 700, a plurality of the sliders 713 each including the magnetic head 710 are provided, being substantially equally spaced. Each magnetic head 710 is moved in a range which is equal to a space between each slider 713. Since a plurality of the magnetic heads 710 are provided, it is possible to reduce the dynamic range of a driving distance between the main driving section 770 and the sub driving section 750. Accordingly, tracking accuracy on the order of nanometers can be easily secured. Moreover, a plurality of the magnetic heads 710 may be used in combination for recording and reproducing, thereby obtaining high-speed or highly reliable recording and reproducing.

EXAMPLE 7

A fabrication method of the magnetic head 100 of Example 1 will be described below as Example 7 of the present invention.

Referring to FIG. 1, the substrate 101 was an optical glass substrate. A CoNbZr/NiFe/CoFe lamination film was formed on the substrate 101 by sputtering. The lamination film was subjected to patterning to produce the lower portion of the magnetic head core 130 and the magnetic gap 120. For example, the thickness of the magnetic head core 130 was about 0.08 $\mu$m. The length of the magnetic gap 120 was about 0.08 $\mu$m.

Thereafter, an Al film was formed on the magnetic head core 130 by sputtering. The Al film was oxidized by plasma to form an $Al_2O_3$ film. A CoFe/IrMn lamination film was formed on the $Al_2O_3$ film by sputtering. The $Al_2O_3$ film and the CoFe/IrMn lamination film were subjected to patterning to form the insulating layer 185 of $Al_2O_3$ and the pinned layer 190.

An Au film was formed on the magnetic head core 130 and the pinned layer 190 by sputtering, followed by patterning to form the lead portion 160 and 161. The magnetic head core 130 was coated with an $Al_2O_3$ insulating film. An Au film was formed on the $Al_2O_3$ insulating film, followed by patterning to form the coil portion 140. An $Al_2O_3$ insulating film was provided on the coil portion 140. A through hole was provided in the $Al_2O_3$ insulating film. A CoNbZr film was formed on the $Al_2O_3$ insulating film by sputtering to provide an upper portion of the magnetic head core 130. The upper portion of the magnetic head core 130 made of CoNbZr/NiFe/CoFe was thus coupled to a lower portion of the magnetic head core 130 to provide the whole magnetic head core 130.

Further, the entire surfaces of the components of the magnetic head 100 were coated with an $Al_2O_3$ insulating film, followed by flattening by a mechanical process.

Next, the laser condenser 507 shown in FIG. 5 was fabricated on the optical glass substrate 101 in the following way. A resist was provided on the rear side of the substrate 101, followed by photolithography using a stepper. A micro Fresnel lens was formed as the diffraction optical device 512 on the substrate 101. Thereafter, a metal reflection film of Ag was provided on the front surface of the substrate 101.

Next, a fabrication method of the recording medium 116 (FIG. 5A) will be described below.

A TbFeCo film and a GdFeCo film were sequentially laminated on a disk substrate by sputtering to provide the magnetic layer 117 of the recording medium 116. TbFeCo has a compensation temperature of about 60° C. GdFeCo has a Curie temperature of about 280° C.

A recording/reproducing apparatus including the magnetic head 100 and recording medium 116 fabricated in the above-described processes were subjected to an operation test. A commercially available laser light source having a wavelength of about 680 nm was used. A signal was recorded onto the recording medium 116 using the magnetic head 100 while irradiating the laser light 514 to the recording medium 116. Thereafter, a recording pattern on the recording medium 116 was observed by a magnetic field microscope (MFM). It was found that the track width was about 0.08 $\mu$m and the bit length was about 0.05 $\mu$m at the most.

Next, the recording medium 116 was read by the magnetoresistance device 150 while irradiating the recording medium 116 by the laser light 514. It was found that the above-described recorded signal could be read.

The above-described recording density by the recording/reproducing apparatus of the present invention significantly exceeds the conventional recording density, i.e., the track width of about 0.8 $\mu$m and the bit length of about 0.1 $\mu$m, achieving a hyper recording density of about 100 Gb/inch$^2$ or more.

EXAMPLE 8

A fabrication method of the magnetic head 200 and 300 of Example 2 will be described below as Example 8 of the present invention.

Referring to FIG. 2, the substrate 201 was a silicon substrate. At a position where the magnetic head core 230 of the magnetic head 200 was to be provided, an Au film was formed by sputtering, followed by patterning. An Al$_2$O$_3$ insulating film was formed on the Au film to form a lower portion of the coil portion 240 of the magnetic head 200.

A FeTaN film was formed on the substrate 201 at a position where the magnetic head core 230 of the magnetic head 200 was to be provided. A CoNbZr/NiFe/CoFe lamination film was formed on the substrate 201 at a position where the magnetic head core 231 of the magnetic head 300 was to be provided. Those films were subjected to patterning to form the magnetic head cores 230 and 231 and the magnetic gaps 220 and 221. For example, the thickness of regions (210, 211, 213, and 214) of the magnetic head cores 230 and 231 was about 0.1 $\mu$m, corresponding to the track width. The length of the magnetic gap 220 was about 0.10 $\mu$m. The length of the magnetic gap 221 was about 0.08 $\mu$m. The maximum thickness of a region around the coil portion 240 of the magnetic head core 230 was about 1 $\mu$m.

Thereafter, an Al film was formed on the magnetic head core 231 by sputtering. The Al film was oxidized by plasma to form an Al$_2$O$_3$ film, i.e., an. insulating layer 285. A CoFe/PtMn lamination film was formed on the Al$_2$O$_3$ film by sputtering. The Al$_2$O$_3$ film and the CoFe/PtMn lamination film were subjected to patterning to form the pinned layer 290. Thus, the magnetoresistance device 250 was fabricated.

Next, a Pt film was formed on the magnetic head core 231 and the pinned layer 290 by sputtering, followed by patterning to form the lead portion 260 connected to the magnetoresistance device 250 and the lead portion 261 connected to the magnetic head core 231. Further, the entire surfaces of the components of the magnetic head 300 were coated with an Al$_2$O$_3$ insulating film, followed by flattening by a mechanical process.

On the other hand, the entire magnetic head core 230 was coated with an Al$_2$O$_3$ insulating film. An Au film was formed on the Al$_2$O$_3$ insulating film, followed by patterning. The resultant magnetic head core 230 was coupled to the above-described lower portion of the coil portion 240, which had previously been provided, to obtain the coil portion 240.

Further, the overall components of the magnetic head 300 were coated with an Al$_2$O$_3$ insulating film, followed by flattening by a mechanical process. Thus, the magnetic head 300 was completely fabricated.

The above-described coil portion 240 may be fabricated by various methods. An example of the fabrication method will be described with reference to FIGS. 8A, 8B, and 8C.

Figure 8A:
FIGS. 8A through 8C are a plan view illustrating an example of a fabrication process of a magnetic head according to Example 8 of the present invention.
Figure 8B:
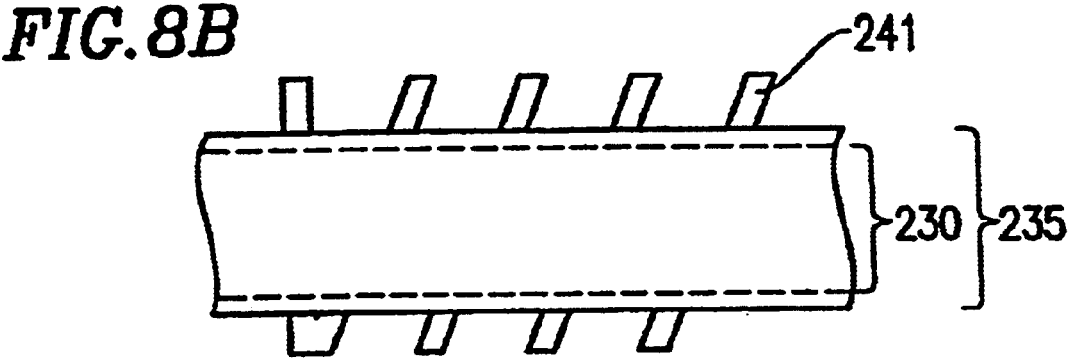
Figure 8C:
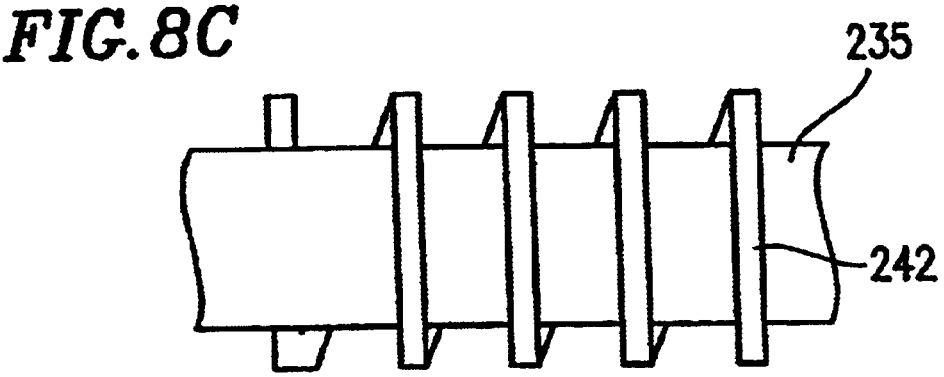

Referring to FIG. 8A, a conductive film made of Au or the like was formed on a substrate (not shown), followed by patterning to form the lower portion of the coil portion 241. Referring to FIG. 8B, an insulating film made of Al$_2$O$_3$ or the like (not shown) was formed on the lower portion of the coil portion 241. The magnetic head core 230 (portion indicated by a dotted line) was formed on the lower portion of the coil portion 241. Further, the magnetic head core 230 was coated with an insulating film made of Al$_2$O$_3$ or the like, i.e., the isolating film 235. Referring to FIG. 8C, a conductive film of Au or the like was formed on the insulating film 235, followed by patterning to form the upper portion of the coil portion 242. The lower portion 241 and upper portion 242 of the coil portion 240 were coupled to each other to obtain the coil portion 240.

Figure 9:
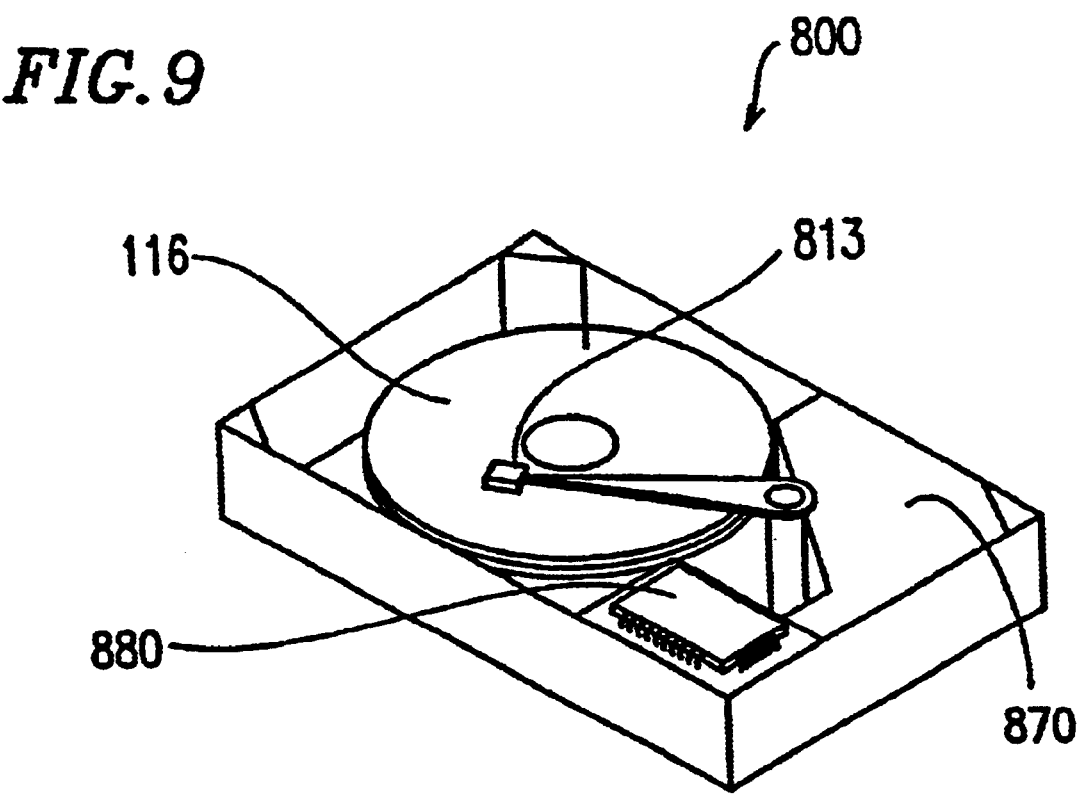
FIG. 9 is a perspective view illustrating a recording/reproducing apparatus according to Examples 8 and 9 of the present invention.

Referring to FIG. 9, a recording/reproducing apparatus 800 including a slider 813, a recording medium 116, a servo portion 870, and a signal processing portion 880 was fabricated and was subjected to an operation test. The slider 813 supports the magnetic heads 200 and 300. The recording medium 116 was in the shape of a disk, having a magnetic layer 117 of CoCrPt.

Using the magnetic head 200, recording was carried out on the recording medium 116 where the track width was about 0.1 $\mu$m and the bit length was about 0.05 $\mu$m. It was confirmed by MFM that the desired recording pattern was recorded.

Thereafter, a recorded signal was read out by the magnetic head 300. A clear reproduced waveform corresponding to the recording bit length of about 0.05 $\mu$m was observed. It was thus found that a hyper recording density of about 100 Gb/inch$^2$ or more could be obtained.

The magnetic heads 200 and 300 do not need to be fabricated at the same time, and may be provided on separate substrates.

Further, the magnetic head 300 fabricated in the above-described way was incorporated into a streaming tape apparatus, and subjected to a signal reproducing test in which a tape recording medium was reproduced for about 1000 hours. It was found that there was substantially no degradation of the reproduction function.

EXAMPLE 9

A fabrication method of the magnetic head 500 of Example 4 will be described below as Example 9 of the present invention. In the fabrication steps described below for the magnetic head 500, the magnetic head 300 was preferably fabricated at the same time. Nevertheless, description of fabrication steps of the magnetic head 300 which was fabricated at the same time are omitted in order to clearly show the fabrication method of the magnetic head 500. The magnetic head 300 can be fabricated in the same steps as described in Example 8.

The fabrication steps of the magnetic head 500 will be described as follows. Referring to FIG. 4, the substrate 201 was an optical glass substrate. An Au film was patterned by sputtering at a position where the magnetic head core 430 was to be provided. An $Al_2O_3$ insulating film was formed on the Au film to form a lower portion of the coil portion 440.

A FeTaN film was formed for the head core 430 and the return yoke portion 411, followed by patterning to form the magnetic core 430. The entire magnetic head core 430 was coated with an $Al_2O_3$ insulating film. An Au film was formed on the $Al_2O_3$ insulating film, followed by patterning to form an upper portion of the coil portion 440. The upper and lower portions of the coil portion 440 were coupled to each other to form the coil portion 440. Further, the entire surfaces of the components of the magnetic head 500 were coated with an $Al_2O_3$ insulating film, followed by flattening by a mechanical process. The detailed fabrication steps of the coil portion 440 are the same as described in Example 8.

The region 410 of the magnetic head core 430 had a thickness of about 0.08 $\mu$m which defines the track width. The magnetic head core 430 around the coil portion 440 had a thickness of about 1 $\mu$m at the maximum. The track width of the magnetic head 300 which was fabricated at the same time with the magnetic head 500, i.e., the thickness of the soft magnetic films 213 and 214, was about 0.07 $\mu$m.

Similar to Example 8, a recording/reproducing apparatus 800 (FIG. 9) including the magnetic heads 500 and 300 was fabricated and was subjected to an operation test. The recording medium 116 in Example 9 was in the shape of a disk, having a structure shown in FIG. 6 such that dots of a FePt film each having a diameter of about 5 nm are distributed in a nonmagnetic matrix containing carbon as a main component.

Using the magnetic head 500, recording was carried out on the recording medium 116 where the track width was about 0.08 $\mu$m and the bit length was about 0.05 $\mu$m. It was confirmed by MFM that the desired recording pattern was recorded.

Thereafter, a signal recorded by the magnetic head 500 was read out by the magnetic head 300. A clear reproduced waveform corresponding to the recording bit length of about 0.05 $\mu$m was observed. It was thus found that a hyper recording density of about 100 Gb/inch$^2$ or more can be obtained.

EXAMPLE 10

A fabrication method of the sub driving section 750 shown in Example 6 will be described below as Example 10 of the present invention.

Referring to FIG. 7B, the slider 713 was made of a silicon substrate. An amorphous silicon film having a thickness of about 2 $\mu$m, which was to be a sacrifice layer, was formed on the slider 713 by plasma chemical vapor deposition. A crystalline silicon film having a thickness of about 2.5 $\mu$m, which was to be the movable member 720 of the sub driving section 750, was formed on the amorphous silicon film. Next, a PZT piezoelectric film having a thickness of about 2.5 $\mu$m and a Pt upper and lower electrode film (not shown) having a thickness of about 0.1 $\mu$m, which were to be the driving members 730 and 740, respectively, were formed on the crystalline silicon film by sputtering and deposition, followed by patterning. As a result, the sub driving section 750 was obtained. Thereafter, the magnetic head 710 was fabricated by the above-described fabrication method. Finally, the above-described sacrifice layer was removed by etching so as to make the movable member 720 movable.

As described above, the magnetic head 710 and the sub driving section 750 for accomplishing small movements of the magnetic head 710 were provided on the same surface. For that reason, the fabrication process of the magnetic head 710 and the fabrication process of the sub driving section 750 were consecutively carried out. When the substrate of the magnetic head 710 also serves as the movable member 720, the fabrication process is easier.

In Example 10, the driving members 730 and 740 were made of a piezoelectric material. The magnetic head 710 was easily driven in a tracking direction using a bend in the thickness direction of the piezoelectric film driving member 730 and 740. In a driving test, when a voltage of about ±5 V was applied to the driving members 730 and 740, a displacement of about 1 $\mu$m, which is required for tracking, was obtained. It was further found that a displacement on the order of nanometers was possible by controlling the applied voltage.

EXAMPLE 11

Figure 10:
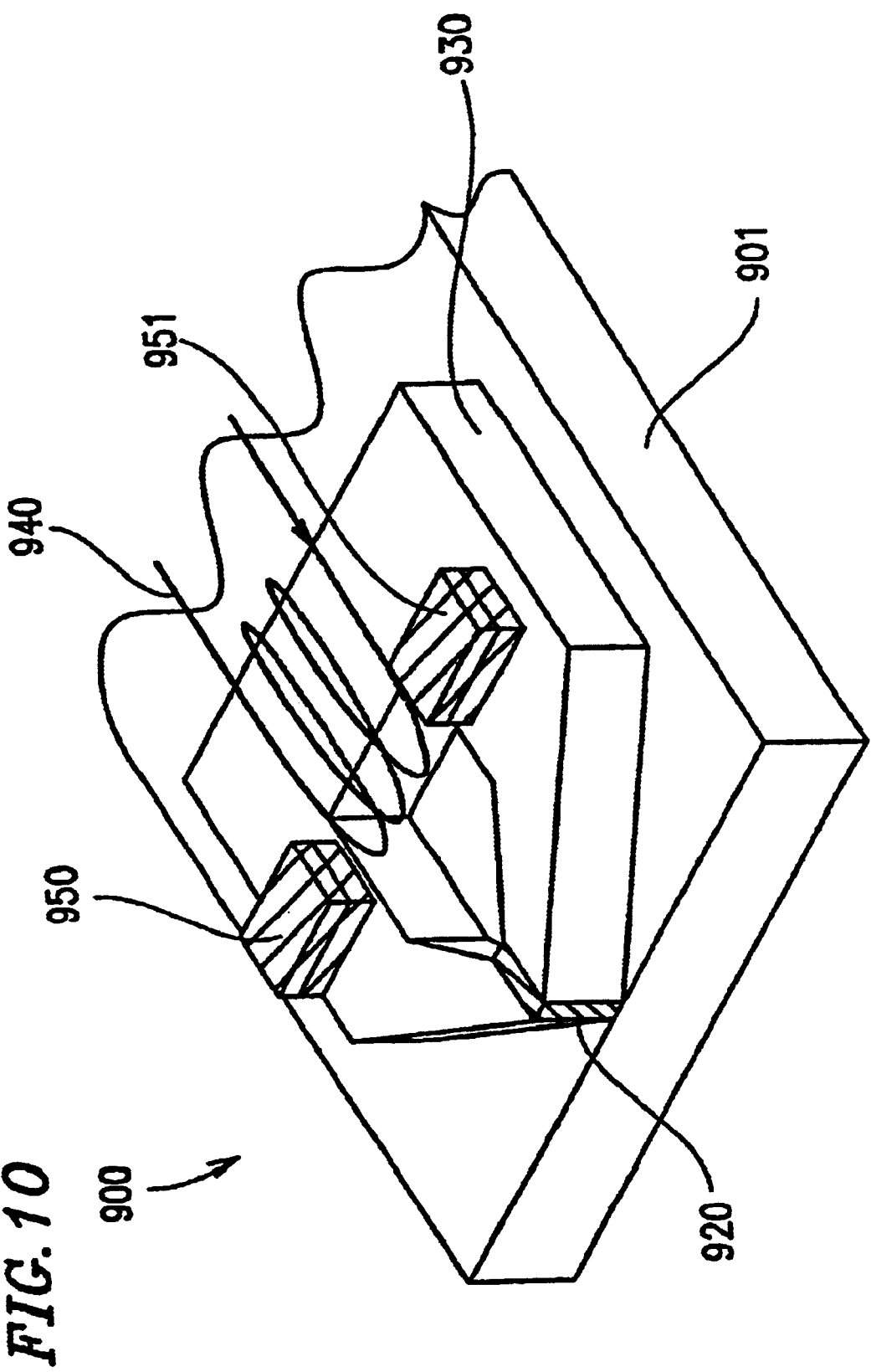
FIG. 10 is a perspective view illustrating a magnetic head according to Example 11 of the present invention.
Figure 11:
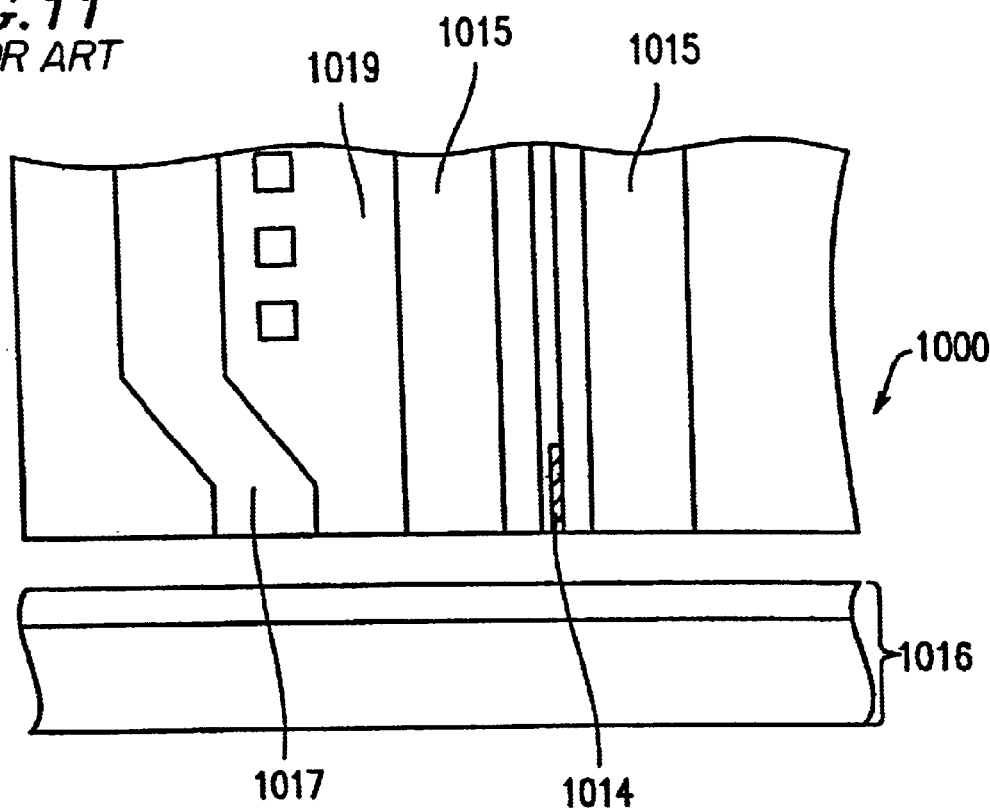
FIG. 11 is a cross-sectional view illustrating a conventional HDD.
Figure 12:
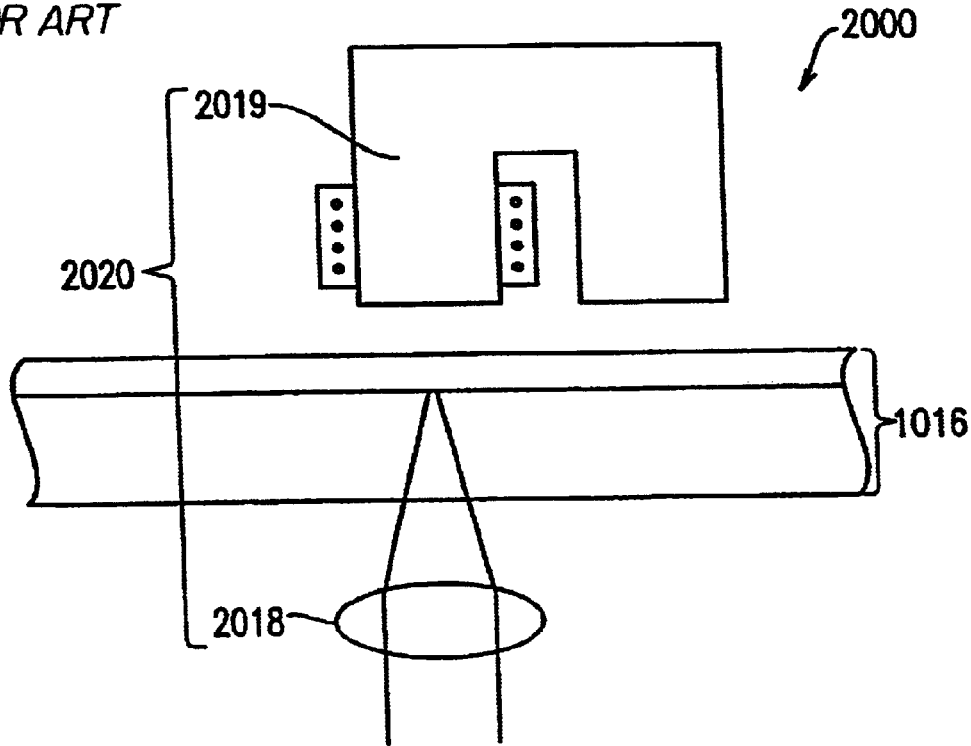
FIG. 12 is a cross-sectional view illustrating a conventional magneto-optical disk apparatus.

FIG. 10 is a perspective view illustrating a magnetic head 900 according to Example 9 of the present invention. The magnetic head 900 includes a substrate 901, a magnetic head core 930, magnetoresistance devices 950 and 951, and a coil 940. The magnetic head 900 may omit the coil 940 when the recording is not performed but only the reproducing is performed. The magnetic head core 930 is provided on the substrate 901, having a magnetic gap 920. The magnetoresistance devices 950 and 951 are provided on the magnetic head core 930. The detailed description of the magnetoresistance device 950 and 951 is omitted for the sake of simplicity. The magnetoresistance devices 950 and 951 are TMR or GMR devices having a vertical current type magnetoresistance device structure, more preferably the same structure as that of the magnetoresistance device 150 shown in Example 1. In Example 10, the magnetic head 900 includes two magnetoresistance devices.

In Example 11, at least two magnetoresistance devices 950 and 951 are provided on a single magnetic head core 930. The magnetoresistance devices 950 and 951 are provided symmetrically with respect to the magnetic gap 920 as shown in FIG. 10. Externally introduced signal magnetic fields having the same magnitude and the opposite directions are detected by the two magnetoresistance devices 950 and 951. In this case, the outputs of the magnetoresistance devices 950 and 951 have the same mangitude and the opposite phases to each other. Accordingly, when the difference between the outputs of the magnetoresistance devices 950 and 951 is used as an output of the whole, the magnitude of an output signal is two times as large as that of a single magnetoresistance device. Noise components of the two magnetoresistance devices 950 and 951 have opposite phases to each other so that the noise components are canceled, thereby obtaining a satisfactory S/N ratio. As described above, thermal noise and asymmetry can be reduced by two or more magnetoresistance devices detecting the signal magnetic field.

As described above, according to the present invention, the magnetic head for use in recording/reproducing a signal includes the magnetic head core having the soft magnetic film whose thickness is the same as the track width of a recording medium. For that reason, it is possible to process a track width of about 0.1 $\mu$m or more fine which is difficult to obtain using a conventional magnetic head.

Further, according to the present invention, the magnetic head for use in recording/reproducing a signal includes the magnetic head core having the soft magnetic film which serves as the free layers of the magnetic head core and the magnetoresistance device. For that reason, it is possible to efficiently conduct a signal magnetic flux into the free layer of the magnetoresistance device.

According to the present invention, a hyper recording density of about 100 Gb/inch$^2$ or more can be obtained which cannot be realized by conventional HDDs and magneto-optical disks.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic head for reproducing a signal recorded on a recording medium, comprising:
    a substrate;
    a magnetic head core provided on the substrate, having a magnetic gap; and
    a first magnetoresistance device provided an the magnetic head core,
        wherein the first magnetoresistance device comprises:
            a first insulating layer provided on the magnetic head core; and
            a first pinned layer provided on a side of the first insulating layer opposite to the magnetic head core, wherein a magnetization direction is not easily rotated in the first pinned layer,
        wherein the magnetic head core comprises a first soft magnetic layer provided at a position corresponding to the first insulating layer, and the first soft magnetic layer functions as a first free layer of the first magnetoresistance device, wherein a magnetization direction is easily rotated in the first free layer.

2. A magnetic head according to claim 1 further comprising a second magnetoresistance device provided on the magnetic head core,
    wherein the second magnetoresistance device comprises:
        a second insulating layer provided on the magnetic head core; and
        a second pinned layer provided on a side opposite to the magnetic head core of the second insulating layer, wherein a magnetization direction is not easily rotated in the second pinned layer,
    wherein the magnetic head core comprises a second soft magnetic layer provided at a position corresponding to the second insulating layer; and the second soft magnetic layer functions as a second free layer of the second magnetoresistance device, wherein a magnetization direction is easily rotated in the second free layer.

3. A magnetic head according to claim 2, wherein the first magnetoresistance device and the second magnetoresistance device are provided symmetrically with respect to the magnetic gap.

4. A magnetic head according to claim 2, wherein the first soft magnetic layer and the second soft magnetic layer are the same soft magnetic layer.

5. A magnetic head according to claim 1 further comprising a coil, wherein the coil is provided in such a manner that at least a portion of the magnetic head core is surrounded by the coil; and a signal is recorded on the recording medium by a magnetic field from the magnetic head core generated by the coil.

6. A magnetic head according to claim 1 further comprising a laser condenser for heating a region of the recording medium in the vicinity of the magnetic gap.

7. A magnetic head according to claim 6, wherein the substrate functions as the laser condenser.

8. A magnetic head according to claim 6, wherein the laser condenser comprises a diffraction optical device.

9. A magnetic head according to claim 8, wherein the diffraction optical device is a Fresnel lens.

10. A magnetic head according to claim 1, wherein the magnetic head core comprises at least one of NiFe(—Co), CoFe, CaFeB and CoNbZr.

11. A magnetic head according to claim 1, wherein the first pinned layer comprises Co or CoFe pinned by PtMn, IrMn, or NiMn.

12. A magnetic head according to claim 2, wherein the second pinned layer comprises Co or CaFe pinned by PtMn, IrMn, or NiMn.

13. A recording/reproducing apparatus comprising:
    a magnetic head according to claim 1; and
    the recording medium comprising a first magnetic layer.

14. A recording/reproducing apparatus according to claim 13, wherein the first magnetic layer has a compensation temperature and a Curie temperature.

15. A recording/reproducing apparatus according to claim 14, wherein the compensation temperature is in the range between room temperature and about 100° C., and the Curie temperature is in the range between about 200° C. and about 300° C.

16. A recording/reproducing apparatus according to claim 13, wherein the first magnetic layer comprises a second magnetic layer for recording and a third magnetic layer for reproducing.

17. A recording/reproducing apparatus according to claim 13, wherein the recording medium comprises magnetic film micro dots magnetically separated from each other.

18. A recording/reproducing apparatus according to claim 13, wherein the recording medium is a vertical magnetic storage medium.

19. A recording/reproducing apparatus according to claim 13, wherein the recording medium is a disk.

20. A recording/reproducing apparatus according to claim 13, wherein the recording medium is a tape.

21. A recording/reproducing apparatus according to claim 13 further comprising:
    a support for supporting the substrate;
    a first driving section for driving the support; and
    a second driving section for providing a movement of the magnetic head, provided on the substrate.

22. A recording/reproducing apparatus according to claim 21, wherein the second driving section comprises a thin film; and a movement of the magnetic head is provided by displacement of the thin film in a thickness direction thereof.

23. A recording/reproducing apparatus according to claim 21, wherein the second driving section is driven by a piezoelectric system, an electrostatic system, or an electromagnetic system.

24. A recording/reproducing apparatus according to claim 21 further comprising a plurality of the magnetic heads, wherein the plurality of the magnetic heads are simultaneously driven by the first driving section.

25. A recording/reproducing apparatus according to claim 13, wherein the first magnetic layer comprises at least one of CoCr, CoPt, CoCrPt, CoCrTa, CoTaCrPt, FePt, TbFe, TbFeCo, and GdFeCo.

26. A recording/reproducing apparatus according to claim 16, wherein the second magnetic layer comprises TbFe or TbFeCo; and the third magnetic layer comprises GdFeCo.

* * * * *

UNITED STATES PATENT AND TRADEMARK OFFICE
CERTIFICATE OF CORRECTION

PATENT NO. : 6,650,598 B2  
DATED : November 18, 2003  
INVENTOR(S) : Hiroshi Sakakima et al.

It is certified that error appears in the above-identified patent and that said Letters Patent is hereby corrected as shown below:

Title page,  
Item [56], References Cited, U.S PATENT DOCUMENTS, insert the following:
-- 6,256,171    07/2001    Yoda, et al.           360/235.3  
   6,327,227    12/2001    Katayama           369/13  
   6,180,421    01/2001    Futai, et al.           438/3  
   6,016,290    01/2000    Chen, et al.           369/13  
   5,986,978    11/1999    Rottmayer, et al.     369/13 --  
FOREIGN PATENT DOCUMENTS, insert the following:  
-- 1997-67114   12/01/2000  
   2000-21041   01/21/2000  
   2000-48424   02/18/2000 --

Column 19,  
Line 23, "provided an" should read -- provided on --.

Column 20,  
Line 11, "CaFeB" should read -- CoFeB --; and  
Line 16, "CaFe" should read -- CoFe --.

Signed and Sealed this

Eighteenth Day of May, 2004

JON W. DUDAS  
*Acting Director of the United States Patent and Trademark Office*